United States Patent

Shamshoum et al.

Patent Number: 5,378,672
Date of Patent: Jan. 3, 1995

[54] METHODS AND SYSTEMS FOR MULTI-COMPONENT CATALYST FORMULATION

[75] Inventors: Edwar S. Shamshoum, Houston; David J. Rauscher, Webster; Shabbir A. Malbari, Pasadena, all of Tex.

[73] Assignee: Fina Technology, Inc., Dallas, Tex.

[21] Appl. No.: 846,689

[22] Filed: Mar. 4, 1992

[51] Int. Cl.$^6$ ............................................. C08F 4/02
[52] U.S. Cl. ......................... 502/108; 502/104; 502/523; 526/90; 526/159
[58] Field of Search ............... 502/104, 108, 523

[56] References Cited

U.S. PATENT DOCUMENTS

| | | | |
|---|---|---|---|
| 4,287,328 | 9/1981 | Kikuta et al. | 526/115 |
| 4,316,966 | 2/1982 | Mineshima et al. | 525/53 |
| 4,476,289 | 10/1984 | Mayr et al. | 526/125 |
| 4,567,155 | 1/1986 | Tovrog et al. | 502/123 |
| 4,636,486 | 1/1987 | Mayr et al. | 502/121 |
| 4,767,735 | 8/1988 | Ewen et al. | 526/159 |
| 4,794,096 | 12/1988 | Ewen | 502/117 |
| 4,892,851 | 1/1990 | Ewen et al. | 502/104 |
| 4,927,797 | 5/1990 | Ewen | 502/127 |

FOREIGN PATENT DOCUMENTS 0129368 12/1984 European Pat. Off. ..... C08F 10/00

OTHER PUBLICATIONS

J. Boor, "Ziegler–Natta Catalysts in Polymerizations", Academic Press, Inc. New York (1979), Chapter 4.

*Primary Examiner*—Joseph L. Schofer
*Assistant Examiner*—David Wu
*Attorney, Agent, or Firm*—William D. Jackson; Jim D. Wheelington; M. Norwood Cheairs

[57] ABSTRACT

A system for combining the components of a multi-component catalyst system comprising at least four chambers with flow passageway means connecting the chambers in series. The catalyst components can include a transition metal, an electron donor and a cocatalyst, which are sequentially mixed together in the course of formulating a Ziegler-type system to be charged to an olefin polymerization reactor. The passages between the second and third chambers have valves. Each of the second and fourth chambers is provided with an inlet opening separate from the interconnecting flow passages and a vent opening separate from the inlet openings and the interconnecting flow passages. The chamber also has an outlet opening. This system also has flushing inlet passages for each of the four chambers which are connected to a manifold adapted to be connected to a source of nitrogen. In operation of the system, the catalyst components in the first and second chambers are discharged into the third chamber where the catalyst components are maintained in mixture with one another for a desired first contact time. The contents of the third chamber are discharged into a fourth chamber where they are mixed with a third catalyst component for a desired second contact time. The contents of the fourth chamber, comprising the multi-component catalyst system, are then discharged into a reactor where they are contacted with at least one reactant to effect catalysts of the desired chemical reaction within the reactor.

18 Claims, 1 Drawing Sheet

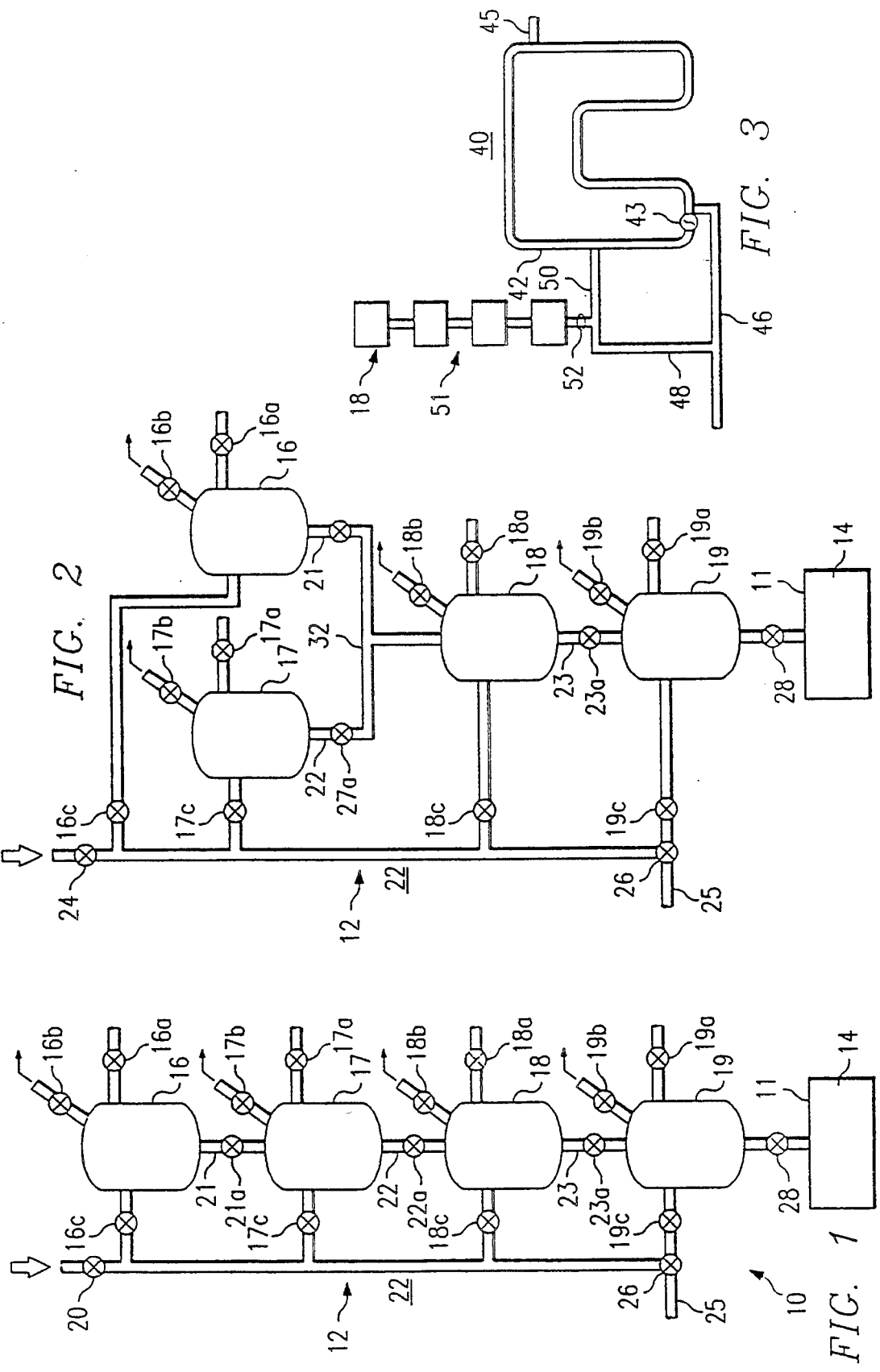

METHODS AND SYSTEMS FOR MULTI-COMPONENT CATALYST FORMULATION

FIELD OF THE INVENTION

This invention relates to the formulation of multi-component catalyst systems and more particularly to processes and systems for sequentially mixing various components thereof under conditions in which orders of addition and durations of mixing can be closely controlled.

BACKGROUND OF THE INVENTION

In the catalysts of chemical reactions there are various reaction protocols which may be employed in the course of bringing a catalyst into contact with the reactants involved in such chemical reactions. In one type of procedure in which the catalyst system may be used and then regenerated for further use, a stream of one or more reactants is passed through a bed of the catalyst with the reaction taking place in the catalyst bed and perhaps carried to conclusion after the chemical stream passes from the catalyst bed into a post-reaction system. An alternative system in which the catalyst is "used up" involves introducing the catalyst, either continuously or intermittently, into a reaction zone where it catalyzes the chemical reaction involved and ultimately is withdrawn from the reaction zone as a minute portion of the desired product. One example of this type of operation is in reactor injection molding (RIM) in which molded articles are formed of products such as polyurethane and the like. Here, the catalyst system is actually introduced into the mold along with the polymer precursor and at the conclusion of the polymerization step the mold is opened and the molded article then withdrawn.

Another and more widely used industrial process involving the introduction of catalyst into reaction zones is in the polymerization of unsaturated hydrocarbons over catalyst systems which are generally referred to as Ziegler-Natta or simply Ziegler catalysts. Such Ziegler-type catalyst systems and their use in the polymerization of unsaturated hydrocarbons are well known in the art. The hydrocarbons involved in such polymerizations normally take the form of short chain alpha olefins such as ethylene, propylene and butylene, including substituted alpha olefins such as substituted vinyl compounds, for example, vinyl chloride or vinyl toluene. However, such unsaturated hydrocarbons can also include di-olefins such as 1-3-butadiene or 1-4-hexadiene or acetylenically unsaturated compounds such as methyl acetylene or 2-butyne.

Ziegler-type catalysts incorporate a transition metal, usually titanium, zirconium or hafnium, although other transition metals found in Groups 4, 5 and 6 of the Periodic Table of Elements may be employed, which function to provide sites for the insertion of monomer units into growing polymer chains. One type of such polymerization catalysts are the so-called homogeneous catalyst systems in which the transition metal compound is a metallocene comprising one or more substituted or unsubstituted cyclopentadienyl groups coordinated with the transition metal atom forming the situs for polymer growth. Such metallocene-based catalyst systems are the subject of European Patent Application EP 129,368 and U.S. Pat. Nos. 4,794,096 to Ewen and 4,892,851 to Ewen et al., the latter two patents disclosing catalysts useful in the polymerization of propylene to form isotactic or syndiotactic polypropylene.

The more widely used transition metal catalysts are the so-called heterogeneous catalyst systems in which a transition metal halide, usually zirconium, hafnium or titanium, di-, tri-, or tetra-halides, are incorporated with a support structure, principally based upon magnesium or zinc halides, ethoxides or the like. For example, U.S. Pat. No. 4,476,289 to Mayr et al. discloses so-called "activated" titanium tetrahalides, more specifically, titanium tetrachloride, supported on anhydrous magnesium or zinc halides, principally magnesium chloride or magnesium bromide. The transition metal component is used in conjunction with a second component, commonly referred to as a co-catalyst, which as described in the Mayr et al. patent, is a hydride or organometallic compound based primarily upon aluminum, although lithium or magnesium based compounds are also disclosed. A supported catalyst containing yet another component is disclosed in U.S. Pat. No. 4,636,486 to Mayr et al. Here, the titanium compound, which may be a halide, an oxyhalide or an alcoholate in either the di-, tri-, or tetravalent form, is composited with the magnesium support, together with an electron donor compound. Such electron donors, commonly referred to as internal electron donors because they are incorporated as part of the transition metal catalyst component, can be selected from a broad class of compounds including amines, amides, phosphines, ethers, thioethers, alcohol esters, aldehydes, and ketones. As in the case of the aforementioned U.S. Pat. No. 4,476,289 to Mayr, the catalyst system here also includes a co-catalyst such as triethylaluminum, commonly referred to as TEAL.

Yet a third component often employed in Ziegler-type catalyst systems is a so-called external electron donor. The external electron donors function similarly as the internal electron donors and in a complimentary or supplementary manner to regulate monomer insertion into the polymer chain growing on the transition metal active sites. Thus, the electron donors can have an impact upon catalyst activity, polymer molecular weight, and polymer morphology as reflected in stereospecificity and physical parameters such as melting point. For example, in the polymerization of propylene, the addition of electron donors under controlled conditions can result in dramatic increases in activity (the amount of polymer produced per unit of catalyst) and in stereoregularity, e.g., an increase in isotactic structure with a corresponding decrease in atactic structure. The most widely used external electron donors are organosilicon compounds such as organosilanes and organosiloxanes including silyl ethers and esters such as alkyl or arylalkyl alkoxysilanes.

U.S. Pat. No. 4,287,328 to Kikuta et al., is directed to the polymerization of alpha olefins in the presence of multi-component catalyst systems involving a "solid product" combined with an organoaluminum compound including, for example, $C_1$–$C_{10}$ trialkylaluminum, triethylaluminum, alkyl alkyoxyaluminums, and alkylaluminum halides, and an electron donor including various organic acids, alcohols, ethers, aldehydes, ketones, amines, alkenol amines, esters, phosphines, phosphites, thioethers, thioalcohols, silanes, and siloxanes. The "solid product" catalyst component is formed by reacting a trivalent metal halide such as aluminum trichloride, aluminum tribromide or ferric trichloride with a rivalent metal compound such as magnesium, calcium, or zinc hydroxide or oxide or carbonate with titanium tetrachloride, characterized as an electron acceptor. Numerous orders of additions and conditions of mixing for the various components are described in Kikula et al., especially in columns 6 through 9. The mixing of the various components can be carried out over periods of several minutes to several hours.

U.S. Pat. No. 4,567,155 to Tovrog et al., discloses multi-component catalyst systems useful in the gas phase polymerization of alpha olefins. In Tovrog et al., the catalyst systems comprise two base catalyst components, each containing subcomponents. The first component, identified as component "A" comprises a titanium component supported on a hydrocarbon insoluble magnesium component in combination with an electron compound. The second major component is a co-catalyst component, characterized as component "B" comprising a trialkylaluminum, an aromatic acid ester and an unhindered secondary amine. Tovrog discloses that catalyst components may be pre-polymerized or otherwise pretreated before being added to the reactor for periods ranging from minutes to hours. In the Tovrog procedure, catalyst components can be added together or separately through one or more valve controlled ports in the reactor vessel. In a procedure specifically described in Tovrog, aluminum alkyl, co-catalyst, and titanium catalyst component were combined in a dry box under nitrogen and flushed into a 2 liter reactor in propylene. Additional propylene and hydrogen were then charged to the reactor.

The pre-polymerization of Ziegler-type catalysts prior to the catalyst being supplied to the polymerization reactor is a well-known expedient. The pre-polymerization step is typically accomplished in a relatively small pre-polymerization reactor prior to introduction of the catalyst into the main polymerization reactor.

U.S. Pat. No. 4,767,735 to Ewen et al. discloses a pre-polymerization process carried out in an elongated tubular reactor for a period of less than a minute and usually ten seconds or less prior to introduction of the catalyst system to a loop-type reactor. Operation may be continuous or intermittent. In the Ewen et al. procedure, an organic solvent stream such as hexane or heptane is established in a pre-mixing line. To this stream are added sequentially a co-catalyst, an external electron donor and a supported catalyst component to form a catalyst system which is then pre-polymerized by contact with propylene for a few seconds in the small diameter tubular reactor. An alternative mode of operation involves adding the electron donor to the carrier stream after the addition of the catalyst component, but still before the addition of the propylene. Ewen et al. disclose that the co-catalyst should be present when the electron donor and the transition metal catalyst component contact one another in order to avoid poisoning of the titanium catalyst.

High efficiency catalyst systems employing external electron donors which may be characterized generally as sec or tert alkyl or cycloalkyl, alkyl dialkoxy silanes in combination with titanium tetrachloride supported on magnesium based supports derived from dialkoxy magnesium compounds are disclosed in U.S. Pat. No. 4,927,797 to Ewen. By way of example, the supported catalyst may be formulated through the reaction of diethoxy magnesium, titanium tetrachloride and n-butyl phthalate under appropriate conditions as specified in the patent. A suitable external electron donor here is methylcyclohexyl dimethoxysilane which is compared with diphenyldimethoxysilane as disclosed in the aforementioned Ewen et al. patent.

SUMMARY OF THE INVENTION

In accordance with the present invention there are provided novel processes and systems for the formulation of multi-component catalyst systems to be charged to a reactor. In carrying out the invention, there is provided a plurality of at least four chambers. The series of chambers includes first and second chambers which contain first and second catalyst components. A third chamber is connected to the second chamber and a fourth chamber, which contains a third catalyst component, is connected to the third chamber. Preferably, the four chambers are connected in a series relationship, although in certain applications involving particular sequences of additions such as in certain formulation protocol for Ziegler-type catalyst systems, the first and second chambers may be connected in parallel to one another, each being in series with the third chamber. In either configuration, the contents of the first and second chambers are discharged into the third chamber and the first and second catalyst components are maintained in mixture with one another for a desired first contact time. Thereafter, the contents of the third chamber are discharged into the fourth chamber where they are mixed with the third catalyst component for a desired second contact lime. The contents of the fourth chamber, comprising the multi-component catalyst system, are then discharged-into a reactor where they are contacted with at least one reactant to effect catalysts of the desired chemical reaction within the reactor.

A preferred application of the invention is in the formulation of Ziegler-type catalysts following protocols which may involve various orders of addition and mixing times between the several catalyst components. Such catalyst components typically include a transition metal component, an electron donor component, and a co-catalyst component which are sequentially mixed together in the course of formulating the Ziegler-type catalyst system to be charged to an olefin polymerization reactor.

Preferably, in carrying out this aspect of the invention, an order of addition is used in which an organoaluminum co-catalyst component is initially contacted with either of the transition metal catalyst or the electron donor component. The initial mixing is carried out for a first contact time, which preferably is two minutes or less. This initial mixture is then discharged from the third chamber into the fourth chamber with the other of the electron donor or transition metal component for a second contact time of no more than one minute and preferably of a duration shorter than the first contact time. The resulting three component system is then discharged from the fourth chamber into the polymerization reactor and contacted with the unsaturated monomer to effect the polymerization reaction.

In one embodiment of the invention, the co-catalyst and transition metal catalyst component are initially disposed in first and second series-connected chambers and the electron donor component is in the fourth chamber. The co-catalyst component is discharged from the first chamber into the second under sufficient pressure to displace it and the transition metal component into the third chamber where they are maintained for the desired first contact time. Thereafter, this mixture is displaced into the fourth chamber where it is maintained for the desired second contact time. Preferably, at the conclusion of the second contact time, the resultant three component catalyst system is contacted with an olefinic compound to cause pre-polymerization of the catalyst system prior to supplying the pre-polymerized catalyst to the polymerization reactor. Pre-polymerization is carried out for a relatively short period of time, usually less than one minute, preferably less than about 20 seconds and more desirably, about 10 seconds or less. In a preferred embodiment of the invention, the polymerization of the catalyst system is carried out by discharging the catalyst system from the fourth chamber into an elongated tubular reactor containing the olefinic compound. The olefinic compound and the catalyst system are passed through the tubular reactor at a flow rate sufficient to provide the desired residence time in the reactor, and thereafter discharged from the reactor into the polymerization reactor. Residence times of only a few seconds, about 2 seconds or less, are advantageously employed.

In yet a further aspect of the present invention, there is provided a system for combining the components of a multi-component catalyst system and which may be used to implement the various precontact procedures as intricated previously. The system comprises at least four chambers with flow passageway means connecting the chambers in series to provide a first interconnecting flow passage between the first and second chambers, and second and third such passageways extending respectively between the second and third chambers and the third and fourth chambers. Valve means are interposed at least in the second and third interconnecting passages. Each of the second and fourth chambers is provided with an inlet opening separate from the interconnecting flow passages and a vent opening separate from the inlet openings and the interconnecting flow passages. The fourth chamber is further provided with an outlet opening extending from the fourth chamber. In a more specific aspect of the invention, this system is provided with a flushing inlet passage for each of the four chambers which provides for the introduction of flushing fluid into each of the chambers. Each of these flushing passages are connected to a manifold which, in turn, is adapted to be connected to a source of flushing fluid such as nitrogen.

BRIEF DESCRIPTION OF THE DRAWINGS

FIG. 1 is a schematic illustration showing four component chambers connected in series and leading to a polymerization reactor in accordance with the present invention.

FIG. 2 is a schematic illustration of a modified form of the invention involving parallel-series connected chambers.

FIG. 3 is a schematic illustration of the present invention as used in supplying a pre-polymerized catalyst system to a continuous flow reactor as used for the polymerization of propylene.

DETAILED DESCRIPTION OF THE INVENTION

The present invention will be described in detail with reference to the formulation of a multi-component catalyst system of the Ziegler-type to be used in the polymerization of unsaturated hydrocarbons, specifically the polymerization of propylene.

In the polymerization of unsaturated hydrocarbons over Ziegler-type catalysts, a desideratum common to all such processes, is a high yield of polymer, commonly expressed in terms of catalyst activity. Catalyst activity is normally in terms of grams of polymer per gram of transition metal per hour.

A second important characteristic in polymer production is the bulk density of the polymer. The bulk density, commonly expressed in terms of grams per cubic centimeter, should be relatively high. If the bulk density is too low, the polymer will tend to be "fluffy" and will tend to cause plugging in the polymerization system. This is particularly important in so-called loop-type reactors where the polymerization is carried out in a continuous or a semi-continuous format and where plugging of the withdrawal outlet or other point in the polymerization system can cause serious interruptions in production schedules.

Yet a third important polymer characteristic which is particularly significant in the case of alpha olefins containing three or more carbon atoms is the crystallinity of the polymer product. By way of example, in the polymerization of propylene, the resulting polymer product can be isotactic, syndiotactic or atactic. Syndiotactic and isotactic polymers are crystalline and are insoluble in hydrocarbons solvents such as xylene. Atactic polymers, on the other hand, are amorphous, waxy-type materials which exhibit high solubility in xylene.

As described, for example, in U.S. Pat. No. 4,892,851 to Ewen et al., isotactic and syndiotactic polymers are regular repeatable structures which can be characterized in terms of the Fischer projection formula as described below. In the isotactic structure, all of the methyl groups attached to the tertiary carbon atom of the successive monomer units lie on the same side of a hypothetical plane extending through the main chain of the polymer as indicated schematically by the following two-dimensional representation.

(1)

For syndiotactic structures, the methyl groups attached to the tertiary carbon atoms on successive monomer units lie on alternative sides of the hypothetical plain is as follows:

(2)

For structure (1) above, the isotactic arrangement may be described employing Bovey's NMR nonenclature as—mmmm—in which each m represents a "meso" dyad of two successive methyl groups on the same side of the plane. Using this same nomenclature, the syndiotactic structure (2) above, may be described as—rrrr—, with each r indicating a "racemic" dyad of two successive methyl groups on opposite sides of the hypothetical plane. Of course, similar characterizations may be made for other polymers such as polystyrene or polyvinyl chloride. The non-crystalline atactic polymers involve randomly irregular structures. For a further description of other characterizations of atactic, isotactic and syndiotactic polymers, reference may be had to the aforementioned U.S. Pat. Nos. 4,794,096 and 4,892,851, the entire disclosures of which are incorporated herein by reference.

The present invention may be applied in the formulation of catalyst systems from individual catalyst components which are, in themselves, well known to those skilled in the art. As described previously, there are a wide variety of transition metal catalysts known to be useful in olefin polymerization and such transition metal catalysts may be used in practicing the present invention. As a practical matter, it usually will be desirable to use in olefin polymerization a supported catalyst component and while the supported catalyst component may not have an internal electron donor, as described, for example, in the aforementioned U.S. Pat. No. 4,476,289 to Mayr et al., the supported catalyst component will usually incorporate an internal electron donor as described in the aforementioned Mayr et al. U.S. Pat. No. 4,636,486. The Ziegler transition metal catalysts include, as is well known in the art, salts of transition metals found in Groups 4, 5 and 6 (New Notation) of the Periodic Table of Elements. In addition to the titanium, zirconium and hafnium transition metal components commonly employed in olefin polymerizations, other such transition metals proposed for use in commercial Ziegler-type catalysts include vanadium, niobium, and chromium.

Like the transition metal component, the co-catalyst components used in practicing the present invention can also be selected from materials which are old and well known in the art. They can include metal alkyls, metal alkyl halides and substituted alkyls which can include Group 1 metals such as lithium, sodium and potassium, Group 2 metals such as beryllium, and magnesium, Group 12 metals such as zinc and cadmium and Group 13 metals such as aluminum and gallium. Again, as a practical matter, the co-catalyst will usually take the form of an organoaluminum compound, specifically an aluminum alkyl or aluminum alkyl halide, which, in some cases, may be complexed with another metal alkyl such as a lithium alkyl. Probably the most widely used co-catalysts are trimethylaluminum (TMA) and triethylaluminum (TEAL) with the latter normally being preferred as a co-catalyst in the polymerization of $C_3+$ alpha olefins such as in the production of polypropylene, propylene co-polymers, polyvinylchloride, and the like. For a general discussion of transition metal and co-catalyst components in Ziegler catalysts, reference is made to Boor, John "Ziegler-Natta Catalysts in Polymerizations", Academic Press, Inc., New York (1979) and particularly, Chapter 4 entitled "Chemical Description of Ziegler-Natta Catalysts for Olefins".

Numerous electron donors may be employed in the course of practicing the present invention. The electron donors used in Ziegler-type catalyst systems are Lewis bases which function in the nature of external electron donors as described previously. A wide variety of such Lewis bases are well known in the art. Preferably, the electron donor used here will take the form of organic silicon-containing compounds such as an organic siloxane or silane. Particularly suitable examples include methylcyclohexyl dimethoxysilane, isobutyltri methoxysilane and diphenyl dimethoxysilane. Other suitable catalyst components which can be used in formulating catalyst systems by means of the present invention are disclosed in the aforementioned U.S. Pat. Nos. 4,287,328 to Kikuta et al., 4,567,155 to Tovrog et al., and 4,316,966 to Mineshima et al., the entire disclosures of which are incorporated herein by reference.

Specific applications of the present invention involve the formulation of multi-component Ziegler-type catalyst systems by mixing the various components thereof under certain specific orders of additions and contact times between components when going from one contacting step to another. After the several components are mixed together, the resulting multi-component catalyst is then contacted with the involved unsaturated monomer, preferably an alpha olefin, to effect polymerization of the monomer in the presence of the Ziegler-type catalyst. Preferably, the initial olefin contacting step subsequent to formulation of the composite catalyst is a pre-polymerization step with the resulting pre-polymerized catalyst then being supplied to a polymerization reactor to produce the desired polymer product.

The polymerization process may be carried out as either a batch-type, continuous, or semi-continuous process, but preferably, polymerization of the olefin monomer (or monomers) will be carried out in a loop-type reactor of the type disclosed in the aforementioned U.S. Pat. No. 4,767,735 to Ewen et al. As described in the Ewen et al. patent, when the catalyst components are formulated together, they are supplied to a linear tubular pre-polymerization reactor where they are contacted for a relatively short time with the pre-polymerization monomer prior to being introduced into the main loop-type reactor. By way of example, the residence time of the catalyst system and monomer within the pre-polymerization reactor will be normally less than a minute, and usually within the range of a few seconds to perhaps 20 seconds or, more preferably, about 10 seconds or less. In-the experimental work described hereinafter, the catalyst components, after being combined to form the Ziegler-type catalysts, were pre-polymerized for a period of five seconds. Durations of this nature will be suitable in many commercial applications.

In practice, the most significant application of the present invention will be in the formulation of catalyst systems used in the polymerization of $C_3+$ alpha olefins and particularly those polymerizations involving propylene, either alone or with another olefin, for example ethylene, to produce polypropylene or co-polymers such as ethylene/propylene co-polymer. The preferred transition metal components will be in the form of the titanium, zirconium or hafnium halides with supported tetravalent components such as titanium tetrachloride, being used in most commercial applications. Supports will normally take the form of a magnesium or zinc dihalide, dialkyl or dialkoxide such as magnesium dichloride or magnesium diethoxide, which may include magnesium alkoxide halides such as magnesium diethoxychloride. The co-catalyst in such applications will normally take the form of a trialkyl aluminum such as TEAL or TMA as described previously, and the electron donor, a siloxane or silane. A specifically suitable donor is cyclohexylmethyldimethyoxysilane (CMDS) as described previously.

Turning now to the drawings, FIG. 1 presents a schematic illustration showing one embodiment of a system for combining the components of a multi-component catalyst system in accordance with the present invention. As shown in FIG. 1, there is provided a four chamber contacting assembly 10 which is provided with a parallel manifolding system 12 and is connected to a reactor 14. In a system designed for experimental work to which the present invention is particularly well suited, the reactor 14 will take the form of batch-type reaction vessel. Batch-type reactors are involved in forming shaped articles through RIM operations as described earlier. However, as will be described in greater detail hereinafter, the reactor configuration may take other forms. Particularly in-the case of large scale commercial operations, such reactors will normally take the form of continuous or semi-continuous loop-type reactors.

The assembly 10 comprises four reaction chambers 16, 17, 18 and 19, which are connected in series by interconnecting passageways 21, 22 and 23. Each of the interconnecting passageways are provided with a valve 21a, 22a and 23a, as shown. In some applications, the uppermost valve 21a may be dispensed with, although as a practical matter, in order to provide universality of application, each of the interconnecting passageways will be provided valves as shown.

Each of the vessels 16, 17, 18 and 19 are also provided with separate valved component inlets and outlet vents indicated by reference characters post-scripted by a and b, respectively. For example, vessel 16 is provided with a valved inlet 16a for the introduction of a first component and a valved vent 16b to be used in venting the vessel either during the introduction of component or prior thereto. The remaining chambers are provided with similar component inlets and vents, as indicated.

The manifold system 12 includes a main manifold line 22 and lateral flushing inlet lines 16c, 17c, 18c and 19c extending to vessels 16, 17, 18 and 19, respectively. Line 22 is connected through a valved inlet 24 to a nitrogen source. The manifold is also adapted to be connected through a second manifold inlet 25 to a secondary source-of flushing fluid, in this case, a liquid used in cleaning the vessels. In the configuration shown, inlet 25 is provided with a three-way, two position valve 26. The assembly is connected to reactor 14 through valved passage 28 extending from the outlet of the chamber 19.

In an embodiment of the invention configured for laboratory experimentation, the series-connected chambers were provided by 40 ml high pressure bombs formed of stainless steel. The passages extending to and from the high pressure bombs were provided by means of ¼ inch stainless steel tubing equipped with two-way, two-position valves, with the exception of the three-way valve 26, also formed of stainless steel. The reactor used for the experimental work was a two liter "Zipper-clave" reactor.

In the experimental work described below, the assembly was configured in a vertical orientation as shown so that flow from one vessel to the next and into the reactor was under the influence of gravity. In preparing the assembly for experimental work use, nitrogen was flushed into the four-bomb assembly and the reactor through the manifold system. The manifold system was also employed to supply nitrogen in the course of discharging the contents of one bomb to the next bomb in the series as described below.

The four-chamber, series-connected configuration of FIG. 1 is useful in a preferred embodiment of the invention used in formulating Ziegler-type catalysts in which the co-catalyst and transition metal catalyst components of a Ziegler-type catalyst system are initially mixed together, followed by contact of the sub-mixture with the electron donor component. This configuration normally will be preferred for use with other catalyst components as described below. However, an alternative configuration employing two parallel chambers connected in series with two subsequent series-connected chambers, can also be used to meet certain situations. This modified form of combining assembly is illustrated in FIG. 2. With the exception of the parallel series connection of chambers 16, 17 and 18, the system of FIG. 2 is identical to that of FIG. 1 and in FIG. 2, like components are designated by the same reference characters as used in FIG. 1. As shown in FIG. 2, chambers 16 and 17 are parallel to one another and are connected in series with the third chamber 18 by means of a T connection 32.

The system of FIG. 2 can be employed where the two catalyst components to be initially contacted are both liquids. For example, the situation would arise where one catalyst component is organoaluminum co.-catalyst, such as triethylaluminum, and the other is an electron donor, such as CMDS. Both such liquids are oleophilic miscible and a parallel series arrangement as shown with the first contact can be carried out by flowing both liquids at the same time from their respective chambers through the mixing T 32 and into chamber 18 can be used to facilitate the initial contact procedure. The configuration of FIG. 1, can on the other hand, be used to advantage where one of the two initial catalyst components is a solid as in the case of a transition metal catalyst component of a Ziegler-type catalyst system and an organoaluminum co-catalyst component. Here; the catalyst component can be charged to the second chamber 17 in suspension in an oleaginous liquid. The co-catalyst component can be charged to the first chamber 16 and when it is desired to mix the two, valve 21a is opened to displace the co-catalyst from chamber 16 through line 21 into chamber 17. This is accomplished by means of nitrogen supplied via the manifold inlet 16c, together with gravity flow from chamber 16 into-chamber 17. Concomitantly with, or shortly after the opening of valve 21a, valve 22a in the outlet from chamber 17, is opened. Thus, the liquid in chamber 16 becomes mixed with the solid slurried component present in chamber 17 and functions not only to form the first submixture, but also to flush the catalyst component into the empty third chamber 18. Valve 23a, is retained closed for the desired first contact time, after which it is opened to allow the mixed first and second components to flow into the fourth chamber 19, where they are mixed with the third catalyst component, an electron donor and in the example given, disposed within this chamber. After the desire second contact time, valve 28 is opened and the three-component catalyst system is charged into the reactor. This is accomplished with a nitrogen flush supplied via the manifold and line 16c to the top vessel and then through the successive passages 21, 22 and 23. After the contents of the assembly are discharged into the reactor, valve 28 is closed and the polymerization reaction allowed to proceed under the desired conditions of time, temperature and pressure.

Pre-polymerization of the catalyst system can be accomplished by means of a linear pre-polymerization reactor as described below with reference to FIG. 3. However, in batch-type polymerizations, such as may be involved in experimental work, pre-polymerization can be accomplished in the assembly itself by simply charging one or all of the chambers 16 through 19 with the pre-polymerizing monomer and after the desired pre-polymerizing time, then opening valve 28 and discharging the contents to the reactor. For example, in the polymerization of propylene, pre-polymerization can be accomplished by filling the assembly with liquid propylene at the conclusion of the desired second contact time and after the desired pre-polymerization time, then opening valve 28 and forcing the contents from the assembly by pumping liquid propylene through the assembly.

Instead of supplying liquid propylene to the entire assembly in the course of pre-polymerization and charging of the pre-polymerized catalyst to the reactor, it will be recognized that valve 23a can be closed and liquid propylene supplied directly to vessel 19. However, where it is desired to regulate the amounts of materials charged to the reactor as closely as possible, as in comparative experimental test runs, it often times will be desired to charge each of the chambers with liquid propylene, or other monomers as the case may be, and discharging the liquid propylene serially through the chambers and into the polymerization reactor.

It will be recognized that each of the foregoing configurations provide for very close control over the contact times in formulating multi-component catalyst systems. The four chamber arrangement of FIGS. 1 and 2 are ideally suited for the formulation of three-component systems with the third chamber being initially left vacant as described above, to provide for the first pre-contacting step. Configurations similar to those shown in FIGS. 1 and 2, but with additional mixing chambers, can, of course, be provided where it is desired to formulate systems comprising four or more components under closely controlled contact times.

As noted previously, the pre-polymerization time will normally be less than one minute, and typically will only be a few seconds. As indicated in greater detail in co-pending patent application Ser. No. 846,540, entitled "CATALYST FORMULATION AND POLYMERIZATION PROCESSES", filed on even date herewith by the inventors herein the first and second contacting times can be closely controlled to arrive at desired values of polymer products such as bulk density and crystallinity, as well as to achieve good polymer yield in terms of activity of the catalyst system. Normally, the composite of the first and second contact times should be no more than 5 minutes and preferably, this value will be no more than three minutes.

The operation of the multi-component systems of the present invention will be similar, regardless of whether used in commercial applications or in laboratory experimental work. Before undertaking operation of such systems, they can be cleaned by flushing with a suitable solvent such as hexane or heptane. For example, with reference to FIG. 1, liquid flushing fluid can be introduced via line 25 and valve 26 into valved inlet 19c leading to the bottom vessel 19. Solvent injection is continued, with valves 21a, 22a and 23a being in the open position and the remaining valves closed, in an amount sufficient to flood each of the four vessels. Valve 19c can then be closed and valve 19a, or 28 if the assembly is not connected to a reactor, then opened in order to drain fluid from the assembly. Nitrogen can then be supplied to the assembly via inlet 16c under pressure to displace any solvent remaining in the assembly and thereafter, sufficient nitrogen can be introduced to arrive at the desired nitrogen pressure within the assembly, usually a few pounds per square inch atmospheric. Subsequently, the various catalyst components can be introduced into the appropriate chambers as described previously. In this step, the appropriate vent valves will be opened to allow nitrogen to be displaced from the chambers as the components are introduced.

The laboratory configured assembly of the embodiment of FIG. 1, as described previously, was used in experimental work carried out with the three orders of addition as described hereinafter.

In this experimental work, the transition metal catalyst component was a supported titanium tetrachloride catalyst formulated on a magnesium-based support and incorporating N-dibutylphthalate as an internal electron donor. The catalyst had a titanium content of about 2 wt. % and was present in a mineral oil dispersion containing 10 mg of catalyst in 1 Ml of mineral oil. Catalysts of this general nature are known in the art as evidenced, for example, by the aforementioned U.S. Pat. No. 4,927,797. The co-catalyst was triethylaluminum (TEAL), which as noted previously, is a conventional co-catalyst used in the polymerization of propylene. The co-catalyst was a 0.2 molar solution of TEAL, in hexane which had been freshly distilled and dried. The external electron donor used in the experimental work was cyclohexalmethyldimethoxysilane (CMDS) which was obtained from a commercial service, dried by absorption over a molecular sieve and diluted in freshly distilled dry hexane.

Polymerization runs were carried out for a period of one hour at 70° C. Preliminary to conducting a polymerization run, approximately 16 mmol of hydrogen under a pressure of 120 psig was discharged to an empty 2 L Zipperclave reactor which was dried and kept under an internal nitrogen pressure of 1-2 psig. Immediately after charging the reactor with hydrogen, 1 L of propylene was charged to the reactor which was then heated to 70° C. and stirred at 1,000 rpm to effect liquid phase polymerization of the propylene.

The catalyst components were contacted under each of the three-orders of addition described below using an experimental prototype comprising an arrangement of four series connected stainless steel bombs configured in a manner corresponding to the four chamber system of FIG. 1. The first two bombs contained the catalyst components mixed together during the initial contacting step, the third bomb was initially empty, and the fourth bomb contained the catalyst component contacted in the second contact step with the initially formed mixture. The series connected bombs were arranged vertically so that flow from one chamber to the next was aided by gravity. The various steel bombs were charged with the appropriate components via a syringe inside a dry box.

Three order of addition protocols were used in carrying out the experimental work. The first, Protocol A, generally the most favorable order of addition, involved initial mixing of the catalyst and co-catalyst components with the co-catalyst discharged from the uppermost first chamber 16 into the second chamber 17 containing the transition metal catalyst component. The third chamber was, of course, empty as described previously, with the fourth lowermost chamber containing 18 the electron donor.

The second protocol involved initial mixing of the co-catalyst in the first chamber, followed by the electron donor in the second chamber with the transition metal component incorporated into the fourth chamber. The third order of addition, Protocol C, involved displacement of the electron donor from the uppermost first chamber into the second chamber containing the transition metal catalyst and then into the third empty chamber, followed subsequently by displacement of the mixture into the fourth chamber containing the co-catalyst.

Immediately after contact of the first resulting sub-mixture with the third component for the desired pre-contact time, the three component system was contacted with propylene to effect a five second room temperature pre-polymerization of the catalyst. The resulting pre-polymerized catalyst was then discharged into the Zipperclave reactor serving as the polymerization reactor. The pre-polymerization step was carried out by charging the four chamber pre-contact assembly with liquid propylene and after the five second pre-polymerization time, discharging the contents of the pre-contact assembly by pumping propylene through the assembly and into the polymerization reactor.

The results of the pre-mixing under Protocols A, B and C for various initial and secondary contact times are shown in Tables I, II and III, respectively. For each of the tests, the Al/Ti and Al/Si ratios were 200 and 40, respectively, and polymerization was carried out for one hour at 70° C. In Tables I–III, the initial and secondary contact times $T_1$ and $T_2$ are shown in seconds in the first and second columns. The amount of polymer produced in grams is shown in the third column, and the bulk density in grams per cubic centimeter is shown in the fourth column. The melt flow index in grams per 10 minutes for the polymer product is shown in the fifth column and the weight percent of the polymer soluble in xylene is shown in the last column.

TABLE I (Protocol A)

| $T_1$ | $T_2$ (sec) | Yield (gms) | b.d. | MFI | % XS |
|---|---|---|---|---|---|
| 5 | 30 | 174 | 0.47 | 2.06 | 3.32 |
| 10 | 30 | 184 | 0.46 | 2.08 | 3.20 |
| 40 | 30 | 238 | 0.47 | 2.10 | 3.51 |
| 120 | 30 | 242 | 0.46 | 1.91 | 3.11 |
| 40 | 0 | 276 | 0.48 | 2.00 | 3.19 |
| 70 | 0 | 256 | 0.49 | 2.19 | 3.16 |
| 20 | 50 | 278 | 0.42 | 2.59 | 3.12 |
| 20 | 80 | 270 | 0.46 | 2.14 | 2.32 |
| 40 | 60 | 216 | 0.45 | 2.28 | 3.44 |
| 40 | 110 | 214 | 0.42 | 2.16 | 3.24 |

TABLE II (Protocol B)

| $T_1$ | $T_2$ (sec) | Yield (gms) | b.d. | MFI | % XS |
|---|---|---|---|---|---|
| 5 | 30 | 217 | 0.46 | 2.48 | 3.55 |
| 40 | 30 | 240 | 0.44 | 2.68 | 3.87 |
| 70 | 30 | 250 | 0.42 | 2.51 | 4.07 |
| 120 | 30 | 261 | 0.39 | 4.72 | 5.88 |
| 40 | 0 | 242 | 0.46 | 2.57 | 3.83 |
| 70 | 0 | 296 | 0.40 | 2.73 | 3.16 |
| 20 | 50 | 221 | 0.43 | 2.38 | 3.35 |
| 20 | 80 | 258 | 0.41 | 3.28 | 4.31 |
| 40 | 60 | 224 | 0.44 | 2.49 | 3.04 |
| 40 | 110 | 237 | 0.34 | 4.44 | 6.39 |

TABLE III (Protocol C)

| $T_1$ | $T_2$ (sec) | Yield (gms) | b.d. | MFI | % XS |
|---|---|---|---|---|---|
| 5 | 30 | 182 | 0.44 | 3.58 | 4.32 |
| 20 | 30 | 172 | 0.42 | 3.14 | 4.72 |
| 40 | 30 | 151 | 0.42 | 3.22 | 4.47 |
| 120 | 30 | 118 | 0.43 | 2.53 | 3.99 |
| 40 | 0 | 196 | 0.45 | 1.93 | 2.24 |
| 70 | 0 | 176 | 0.45 | 1.93 | 2.40 |

Table IV illustrates additional results carried out for Protocol C, but using polypropylene from a different source than the polypropylene used in the experimental work reported in Tables I, II, and III. Experimental results vary from one propylene source to another. Accordingly, it is considered prudent to not rely upon a direct cross correlation in comparing the experimental results attainted with the second propylene source with those obtained with the first propylene source. However, the work reported in Table IV can be considered with the work reported to Table III to show the results of varying the secondary contact time for Protocol C.

TABLE IV (Protocol D)

| $T_1$ | $T_2$ (sec) | Yield (gms) | b.d. | MFI | % XS |
|---|---|---|---|---|---|
| 20 | 30 | 244 | 0.43 | 3.28 | 2.70 |
| 40 | 30 | 152 | 0.40 | 3.96 | 3.12 |
| 20 | 50 | 167 | 0.40 | 7.11 | 5.26 |
| 20 | 80 | 129 | 0.37 | 6.18 | 4.74 |
| 40 | 60 | 108 | 0.32 | 8.79 | 6.45 |
| 40 | 110 | 135 | 0.38 | 7.95 | 5.46 |

Turning now to FIG. 3 of the drawings, there is illustrated schematically an embodiment of the present invention employing a four chamber precontact assembly of the type described above in conjunction with a tubular pre-polymerization reactor leading to a continuous flow polypropylene reactor. The continuous flow reactor 40 takes the form of a loop 42 of the configuration shown which is equipped with an impeller 43. As will be understood by those skilled in the art, the impeller functions to circulate the polymerization reaction mass continuously through the loop at controlled temperature and pressure conditions. The desired polymer product is withdrawn either continuously or intermittently from the reactor loop 42 via outlet line 45. Propylene is supplied to the reactor by means of a main propylene supply line 46. A relatively small amount of the propylene from the supply source is withdrawn via a by-pass line 48 and supplied to a tubular pre-polymerization reactor 50. Reactor 50 is of the type described in more detail in the aforementioned U.S. Pat. No. 4,767,735. By way of example, the pre-polymerization reactor 50 may be on the order of seven feet long with an internal diameter of about 0.4 inch to provide a residence time within the reactor 50 of only a few seconds. For a more detailed description of the operation of such tubular pre-polymerization reactor in conjunction with the main polymerization reactor, reference is made to the aforementioned U.S. Pat. No. 4,767,735, the entire disclosure of which is incorporated herein by reference.

In accordance with the present invention, the pre-polymerization reactor 50 is equipped with a four chamber procontact assembly 51 of a configuration similar to that shown in FIG. 1. The assembly 51 is connected to the pre-polymerization reactor 50 through a valved inlet 52 and, of course, is also equipped with manifolding and other valved interconnections (not shown in FIG. 3) as described above with reference to FIG. 1.

The precontact assembly 51 is operated in accordance with the desired order of addition of the catalyst components and at the conclusion of the second contact time, valve 52 is opened to supply the multi-component catalyst system into the pre-polymerization reactor 50 and then on to the main reactor loop 42. It will be recognized that operation of the assembly 51 will result in intermittent addition of catalyst components to the reactor with the minimum interval between slugs of multi-component catalyst system dictated to some extent by the desired precontact times. Where the precontact times are very short, supply of multi-component catalyst system to the tubular reactor 50 can be nearly continuous. Where longer precontact times are involved, greater intervals between successive applications of the catalyst system to the pre-polymerization reactor will be involved.

Where the intervals between supply of catalyst become unacceptably long for the desired configuration and rate of operation for the loop-type reactor 42, two or more precontact assemblies 51 (not shown) can be connected in parallel to the pre-polymerization reactor 50 and operated in alternating sequences.

Having described specific embodiments of the present invention, it will be understood that modifications thereof may be suggested to those skilled in the art, and it is intended to cover all such modifications as fall within the scope of the appended claims.

We claim:

1. In a method for the formulation of a multi-component catalyst system, the steps comprising,
    a) providing a plurality of chambers including first and second chambers containing first and second catalyst components, respectively, a third chamber connected to said second chamber by means of a passageway having a closed valve interposed between said second and third chambers, said second chamber being interposed between said first and third chambers in a series relationship, and a fourth chamber connected to said third chamber and containing a third catalyst component;
    b) discharging the contents of said first and second chambers into said third chamber by discharging said first component from said first chamber into said second chamber under sufficient pressure to displace said first and second components into said third chamber and opening the valve in said passageway to permit the flow of said components to said third chamber, and maintaining said first and second components in mixture with one another for a desired first contact time;
    c) thereafter, discharging the contents from said third chamber into said fourth chamber where they are mixed with said third catalyst component for a desired second contact time; and
    d) thereafter, discharging the contents of said fourth chamber into a polymerization reactor where they are contacted with a monomer to effect polymerization of said monomer.

2. The method of claim 1, wherein said first catalyst component is an organoaluminum cocatalyst component of a Ziegler-type catalyst system, the second of said components is a transition metal catalyst component or an electron donor component of said Ziegler-type catalyst system, and said third component is the other of said transition metal catalyst component or electron donor component.

3. The method of claim 2, wherein said first contact time is no more than two minutes.

4. The method of claim 3, wherein said second contact time is no more than one minute.

5. The method of claim 2, wherein said second contact time is shorter than said first contact time.

6. The method of claim 1, wherein said first and second catalyst components are respectively an organoaluminum co-catalyst component of a Ziegler-type catalyst system and said third component is an electron donor component of said Ziegler-type catalyst system.

7. The method of claim 1, further comprising the step of prior to the polymerization of said monomer and at the conclusion of said second contact time, precontacting said catalyst system mixture of said first, second and third catalyst components with an olefinic compound to cause pre-polymerization of said catalyst system and thereafter supplying said pre-polymerized catalyst to said polymerization reactor.

8. The method of claim 7, wherein the precontact of said catalyst system in said pre-polymerization is carried out for a period of less than one minute.

9. The method of claim 7, wherein said catalyst system mixture is contacted in said pre-polymerization step by charging said fourth chamber with liquid propylene for a designated time interval and thereafter discharging the contents of said fourth chamber into said polymerization reactor.

10. The method of claim 9, wherein said precontacting is carried out by charging each of said, first, second, third and fourth chambers with liquid propylene and discharging said liquid propylene serially through said chambers and into said polymerization reactor.

11. The method of claim 10, wherein the precontact of said olefinic compound with said catalyst system in said pre-polymerization step is less than one minute.

12. The method of claim 7, wherein said pre-polymerization of said catalyst system is carried out by discharging said catalyst system mixture from said fourth chamber into an elongated tubular reactor containing said olefinic compound and flowing said olefinic compound and said catalyst system through said tubular reactor at a flow rate sufficient to provide a residence time in said tubular reactor of less than one minute and thereafter discharging said pre-polymerized catalyst from said tubular reactor to said polymerization reactor.

13. The method of claim 7, wherein the composite of said first and second contact times is no more than live minutes.

14. The method of claim 13, wherein the composite of said first and second contact times is less than three minutes.

15. The method of claim 13, wherein said first catalyst component is an organoaluminum cocatalyst component of a Ziegler-type catalyst system, the second of said components is a transition metal catalyst component or an electron donor component of said Ziegler-type catalyst system, and said third component is the other of said transition metal catalyst component or electron donor component.

16. The method of claim 13, wherein said first and second catalyst components are respectively an organoaluminum co-catalyst component of a Ziegler-type catalyst system and a transition metal catalyst component of a Ziegler-type catalyst system and said third component is an electron donor component of said Ziegler-type catalyst system.

17. In a method for the formulation of a multi-component catalyst system, the steps comprising:
    a) providing a plurality of chambers including first and second chambers in parallel with one another and each connected to a third chamber through first and second passageways first and second valves, respectively, said first and second chambers containing first and second catalyst components, respectively;
    b) discharging the contents of said first chamber by passing said first catalyst component through said first valve in said first passageway and discharging the contents of said second chamber by passing said second catalyst component through said second valve in said second passageway to provide a mixture of said first and second components in said third chamber and maintaining said first and second components in mixture with one another in said third chamber to provide a desired first contact time;

c) thereafter, discharging the contents from said third chamber through a third valve in a third passageway extending from said third chamber to a fourth chamber containing a third catalyst component in said fourth chamber where they are mixed with said third catalyst component for a desired second contact time; and d) thereafter, discharging the contents of said fourth chamber into a polymerization reactor where they are contacted with a monomer to effect polymerization of said monomer.

18. The method of claim 17, wherein said first catalyst component is an organoaluminum cocatalyst component of a Ziegler-type catalyst system, the second of said components is an electron donor component of said Ziegler-type catalyst system, and said third component in said fourth chamber is a transition metal catalyst component of said Ziegler-type catalyst.

* * * * *